United States Patent [19]

Harlan

[11] Patent Number: 4,671,731
[45] Date of Patent: Jun. 9, 1987

[54] PORTABLE HOIST

[76] Inventor: Burton C. Harlan, 6445 Kelsey Creek Dr., Kelseyville, Calif. 95451

[21] Appl. No.: 765,056

[22] Filed: Aug. 12, 1985

Related U.S. Application Data

[62] Division of Ser. No. 469,460, Feb. 24, 1983, Pat. No. 4,556,358.

[51] Int. Cl.$^4$ ............................................. B65G 67/02
[52] U.S. Cl. .................................. 414/550; 212/180; 212/244; 16/392; 16/390
[58] Field of Search ................ 16/389, 390, 391, 392; 414/496, 543, 550; 212/244, 180

[56] References Cited

U.S. PATENT DOCUMENTS

| | | | |
|---|---|---|---|
| 189,866 | 4/1877 | Long | 16/389 |
| 894,630 | 7/1908 | Gudeman | 16/390 X |
| 1,479,352 | 1/1924 | Witten | 16/390 |
| 2,517,434 | 8/1950 | Humpal et al. | 414/496 X |
| 2,947,425 | 8/1960 | Nichols | 414/563 X |
| 3,574,391 | 4/1971 | Doboze | 16/390 X |
| 3,845,869 | 11/1974 | Sowers et al. | 414/543 X |
| 3,899,089 | 8/1975 | Wardlaw | 414/543 |
| 4,556,358 | 12/1985 | Harlan | 414/550 |

Primary Examiner—Robert J. Spar
Assistant Examiner—Stuart J. Millman
Attorney, Agent, or Firm—Flehr, Hohbach, Test, Albritton and Herbert

[57] ABSTRACT

A portable hoist is provided for lifting, transporting, and depositing loads onto a platform, such as a work bench, or into a vehicle, such as a pick-up truck. The portable hoist comprises a mounting for attachment to the a wall of a vehicle or a work bench, an upright support structure connected to the mounting by a hinge connection which allows for swinging movement of the support structure about its vertical axis, and a boom pivotally secured at one end to the upper end of the support structure such that the free end of the boom can be raised and lowered. A hydraulic operator acting between the support structure and the boom serves to raise and lower the boom. A sheave is carried at the free end of the boom and a hoist line connected to the support structure loops over the sheave and carries a hook assembly for attachment to the load to be lifted.

3 Claims, 10 Drawing Figures

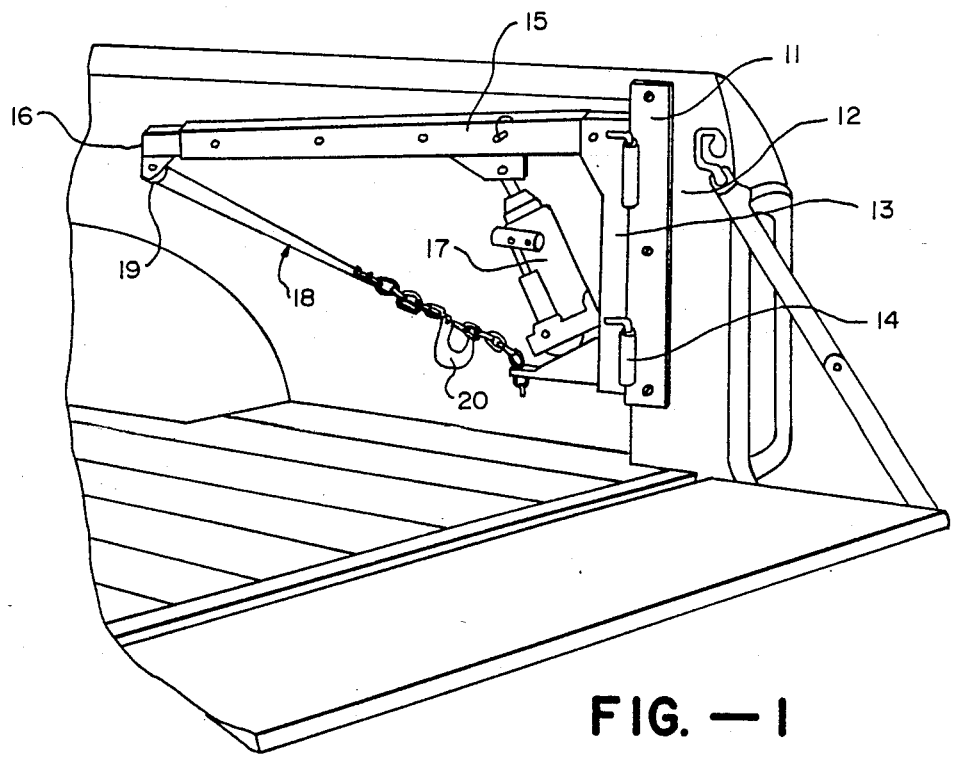
FIG.—1
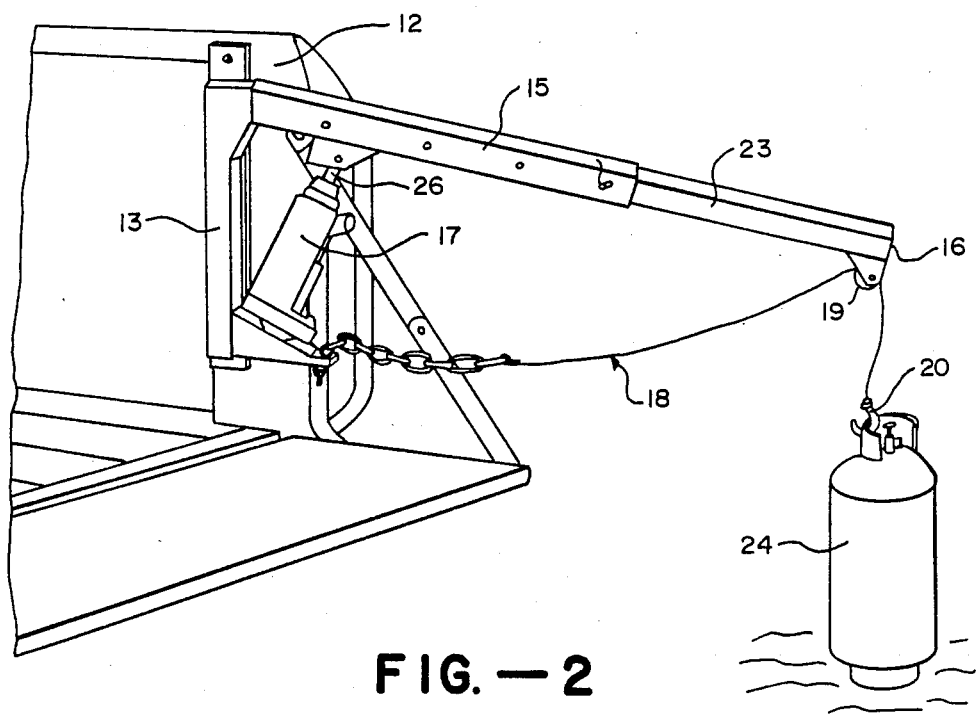
FIG.—2

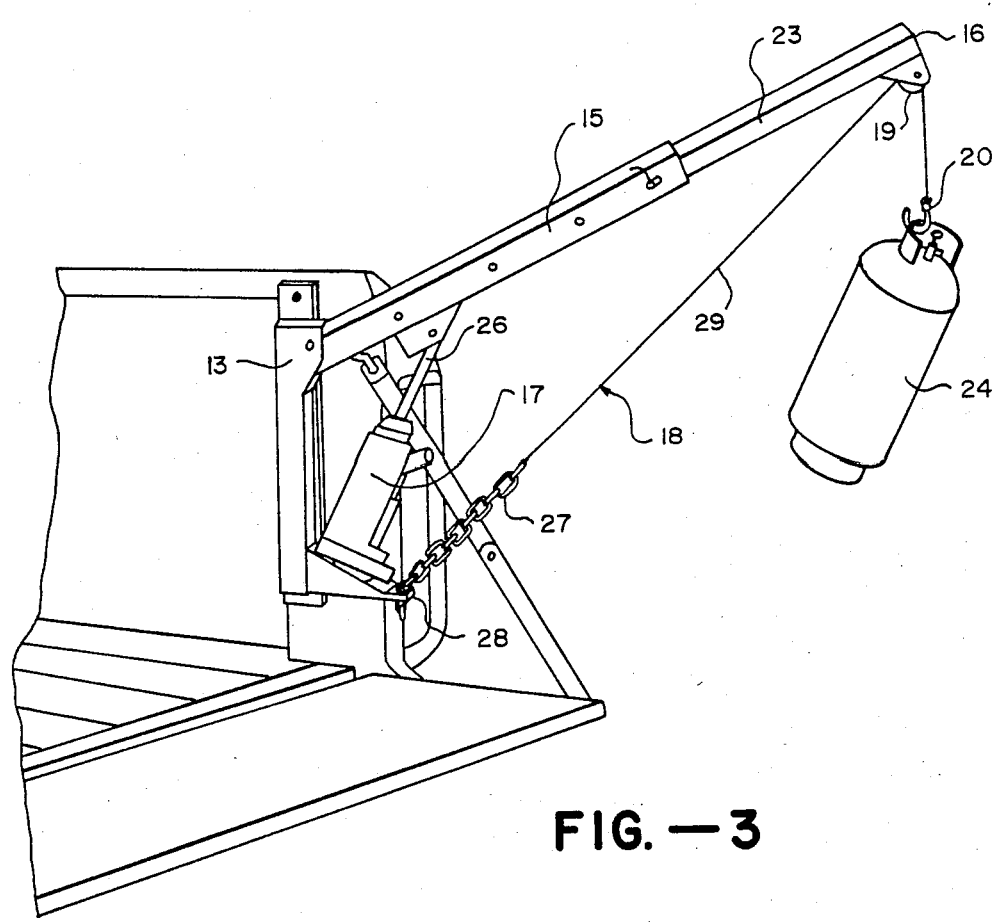
FIG.—3
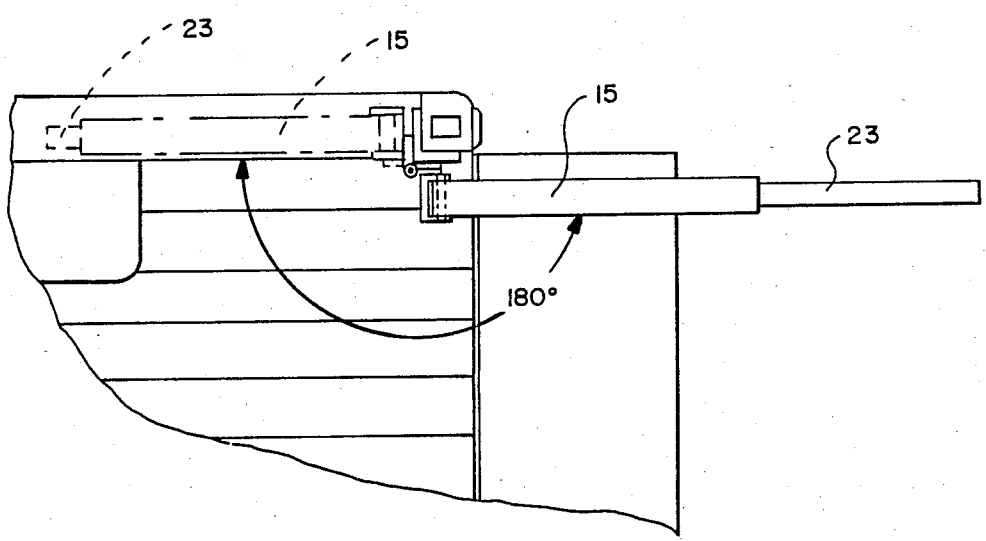
FIG.—4

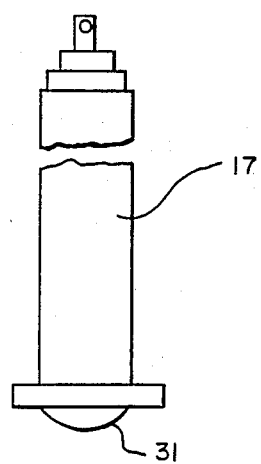
FIG.—5
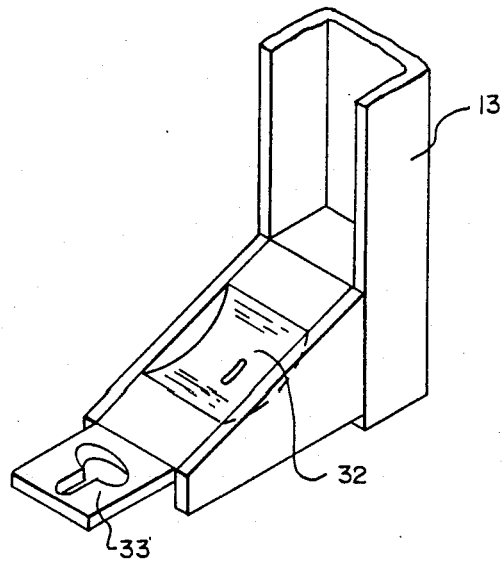
FIG.—6
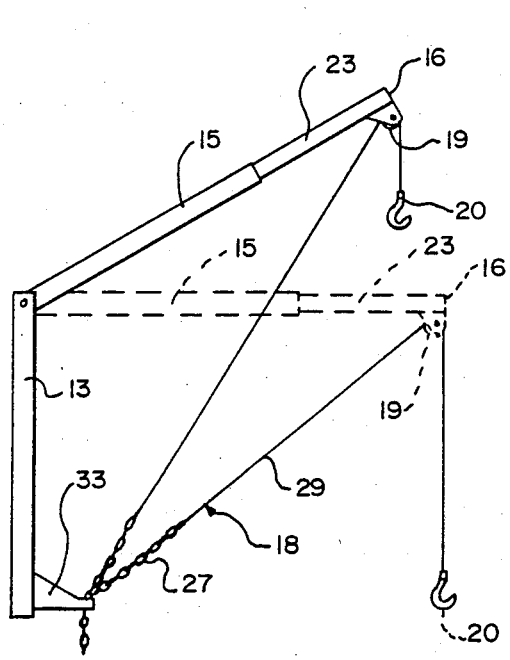
FIG.—7
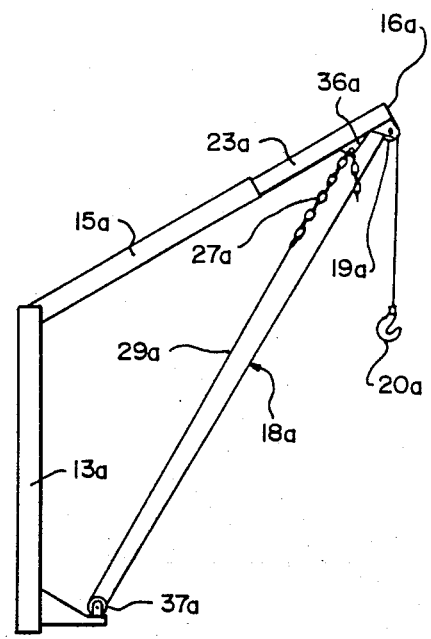
FIG.—8

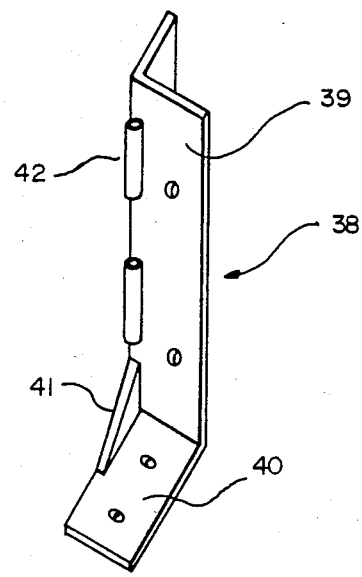
FIG.—9
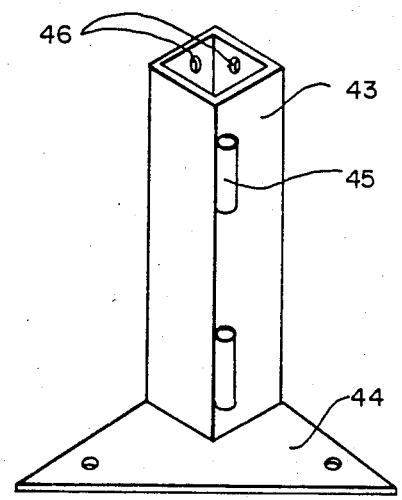
FIG.—10

PORTABLE HOIST

This is a divisional application of patent application, Ser. No. 469,460, filed on Feb. 24, 1983 which issued as U.S. Pat. No. 4,556,358 on Dec. 3, 1985.

The present invention relates generally to a portable hoist for lifting, transporting and depositing a load. Specifically, the present invention relates to a portable hoist for use in loading and unloading vehicles, such as pick-up trucks.

In U.S. Pat. No. 2,374,045, there is disclosed a hydraulic loader or unloader for use in loading or unloading a motor truck. The apparatus in that instance makes use of a mast rotatably mounted in a socket and provided with a handle to facilitate turning of the mast. An arm is pivotally connected to the upper end portion of the mast, and a chain is suspended from the outer end of the arm for gripping a load. A hydraulic ram connects a medial portion of the mast to a medial portion of the arm for raising or lowering the arm. The patent discloses mounting the loader on the floor of the truck body.

In U.S. Pat. No. 2,517,434, there is disclosed a jib crane mounted on a vehicle for lifting a load into the vehicle and vice versa. The patent discloses an apparatus with a vertical post to which is secured a short horizontal arm. A hydraulic cylinder is connected to the intermediate region of the arm at one end and is mounted on a bracket in the bed of the truck at the other end. A piston within the cylinder operates to raise or lower the boom, thus raising or lowering the load. Manual means is provided for rotating the hydraulic cylinder on its bracket thereby swinging the crane as desired. A cable or rod depends vertically from the outer end of the arm terminating in a lift hook.

In general, it is an object of the present invention to improve upon lifting apparatus of the type known in the prior art.

Another object of the present invention is to provide a portable hoist which can be mounted in a vehicle, such as a pick-up truck, in an out-of-the-way position such that no load space is lost.

A further object of the present invention is to provide a portable hoist which can be mounted in a vehicle, such as a pick-up truck, such that it is easily removable for multi-location use. The portable hoist can be mounted on a shop wall, a workbench, or at other locations.

Another object of the present invention is to provide a portable hoist with increased mechanical advantage and stability when loading and unloading objects into a vehicle, such as a pick-up truck, or onto a platform, such as a workbench.

Another object of the present invention is to provide a portable hoist which allows for maximum clearance of the load through a load area opening. A further object of the present invention is to provide a portable hoist with an adjustable boom length to allow for easy loading of loads with variable weights and dimensions through restricted load area openings.

Another object of the present invention is to provide a hydraulic operator mount which allows for easy removal of the hydraulic operator for auxiliary use which holds the hydraulic operator compactly and in alignment to prevent side loading.

In general, the portable hoist comprises a mounting for attachment to a supporting means, such as the sidewall of a vehicle or a shop bench. An upright support structure is connected to the mounting by a means which allows for swinging movement about a vertical axis. A boom is pivotally secured at one end to the upper end of the support structure. A sheave is attached at the free end of the boom and a hoist line is looped over the sheave. One end of the hoist line is connected to the support structure. At the other end of the hoist line is a means for attachment to the load, such as a hook. A means acting between the support structure and the boom effects raising and lowering of the boom. The means for raising and lowering the boom is preferably a hydraulic operator of the cylinder and piston type.

The portable hoist is operated by attaching the object or load to be lifted to the hoist line by the attaching means, such as a hook. Preferably, the boom is raised by means of a hydraulic operator, and the load is swung over the bed of the vehicle or over the platform by swinging the support structure as much as 180° about its vertical axis. The boom is lowered by releasing the pressure in the hydraulic operator and thus the load is deposited in the bed of the truck or onto the respective platform.

Further objects and features of the invention will appear from the following description taken in conjunction with the accompanying drawings.

FIG. 1 is a perspective view of one embodiment of a portable hoist of the invention mounted on a sidewall of a pick-up truck.

FIGS. 2 and 3 are perspective views of the hoist of FIG. 1 in operative positions.

FIG. 4 is a top plan view of the hoist of FIG. 1 in an operative position.

FIG. 5 is an elevational view of a hydraulic operator employed in the hoist of FIG. 1.

FIG. 6 is an isometric view of a mounting for the hydraulic operator in the hoist of FIG. 1.

FIG. 7 is a schematic view of the hoist of FIG. 1 in different operative positions.

FIG. 8 is a schematic view of another embodiment of a portable hoist according to the invention.

FIGS. 9 and 10 are isometric views of additional embodiments of mountings for the portable hoist of the invention.

The portable hoist, as illustrated in FIG. 1, comprises a mounting 11 for attachment to a supporting means 12. The supporting means may be the side wall of a pick-up truck, or other vehicle, as shown in FIG. 1, or may be a sidewall of a workbench or a shop wall. An upright support structure 13 is connected to the mounting 11 by a means 14 which allows for swinging movement of the support structure 13 about a vertical axis. The support structure 13 swings a maximum of 180° in either direction, inwardly or outwardly. Preferably, the means 14 for connecting the support structure 13 to the mounting 11 for swinging movement about a vertical axis is a vertical hinge assembly, as shown in FIG. 1, whereby the portable hoist can be lifted out of the hinge pin receivers and moved to another location.

A boom 15 is attached to the support structure 13. The boom 15 is pivotally secured to the upright support structure 13 at the upper end of the support structure such that the free end of the boom 16 can be raised or lowered. A means 17 acting between the support structure 13 and the boom 15 serves to raise and lower the boom. Preferably, the means 17 for raising and lowering the boom is a hydraulic operator of the cylinder and piston type, as shown in FIG. 1.

The hydraulic operator disclosed in the preferred embodiment is a commercially available unit and may be operated by a manual hand pump and control valve for releasing pressure or may be operated by a powered pump and be line-fed.

The portable hoist of the present invention provides increased mechanical advantage and stability when lifting objects due to the hoist line and sheave arrangement as shown in FIG. 1. The hoist line 18 is connected to the support structure 13 at a level substantially below the pivotal connection of the support structure 13 to the boom 15 and extends outwardly toward the free end of the boom 16 where it loops over a sheave 19 provided at the free end of the boom 16. The hoist line 18 has a means 20 for attachment to a load. The means 20 for attachment to the load can be a hook or other such grappling device.

FIG. 1 also illustrates the mounting of the portable hoist of the present invention on the sidewall 12 of a truck, or other vehicle, in an out-of-the-way position so as to avoid any loss of loading space. This provides an advantage over the prior art hoist which is mounted in the bed of the vehicle where it can interfere with the load-carrying capacity of the vehicle.

The portable hoist in operation is illustrated in FIGS. 2 and 3. FIG. 2 illustrates a portable hoist mounted on the sidewall 12 of a pick-up truck extending rearwardly from the body of the truck. In this position, the portable hoist has been swung 180° from its out-of-the-way position on the sidewall of the pick-up truck. The boom 15 has been extended in length telescopically to an extended position 23 so as to provide greater boom reach from the truck or platform to be loaded to the object to be lifted. The lifting means 20 has engaged the load 24.

Referring to FIG. 3, the boom 15 in its extended position 23 has been raised by the means 17 for raising and lowering the boom. In a preferred embodiment, as shown in FIG. 3, the means 17 for raising and lowering the boom is a hydraulic operator of the cylinder and piston type. The piston 26 of the hydraulic operator is in the raised position due to the hydraulic pressure being exerted upon it.

A comparison of FIGS. 2 and 3 illustrates that when the boom 15 is raised, the hoist line distance between the free end of the boom 16 and the lifting hook 20 is decreased. This provides for greater clearance when the load is swung into the bed of the truck or over the platform to which it is being lifted, and thus provides an advantage over the prior art hoist line of fixed length which is anchored to the free end of the boom. The sheave 19 attached at the free end of the boom 16 provides the portable hoist of the present invention with the capability of decreasing the length of the hoist line between the free end of the boom and the lifting hook as the boom is raised.

Further, FIG. 3 illustrates a preferred embodiment whereby the hoist line 18 is comprised of a chain portion 27 anchored to an eye 28 on the lower end of the support member 13 and a cable portion 29 which loops over the sheave 19 before engaging the object 24 to be lifted. This arrangement provides greater stability for the portable hoist because the boom alone does not bear all the weight of the load to be lifted. The weight of the load is distributed between the boom and the hoist line. This hoist line arrangement also provides an increased mechanical advantage by providing not only a lever means but a pulley means for achieving the lifting action.

Referring to FIG. 4, there is illustrated a top plan view of the boom 15 in its out-of-the-way position shown by broken lines and its capacity to swing 180° to the position shown by solid lines. Further, the extendible characteristic of the boom is illustrated by solid lines at 23. This telescopically extendible feature allows for greater boom reach from the truck or platform to the load to be lifted.

Referring to FIG. 5, there is illustrated a hydraulic operator 17 of the cylinder and piston type with a convex base 31 as is employed in the hoist of FIG. 1. FIG. 6 shows an upright support structure 13 with a concave mounting means 32 extending from its lower end for engaging the convex base of the hydraulic operator. There is an anchor eye 33 attached to the concave mounting 32 to which the hoist line is anchored. The concave mounting and the anchor eye are identical to those in the hoist of FIG. 1. This preferred embodiment for mounting the hydraulic operator provides an advantage over other types of mountings, in that, it provides for a compact mounting and holds the hydraulic operator in alignment to prevent sideloading. Further, the mounting arrangement facilitates removal of the hydraulic operator in the event it is needed for auxiliary use.

Referring to FIG. 7, a preferred embodiment of the portable hoist of FIG. 1 is illustrated schematically. The hoist line 18 is comprised of a chain portion 27 which is anchored to the upright support structure 13 by means of an anchor eye 33. A cable 29 is attached to the non-anchored end of the chain 27. The cable loops over a sheave 19 and carries a means 20 for attaching a load to the hoist, such as a lifting hook.

FIG. 7 further illustrates the increased mechanical advantage provided by the portable hoist of the present invention. When the boom 15 is in the lowered position, shown by broken lines, the hoist line distance between the free end of the boom 16 at the sheave 19 and the lifting hook 20 is at its greatest. When the boom 15 is raised to an elevated position, shown by solid lines, the hoist line distance between the free end of the boom 16 at the sheave 19 and the lifting hook 20 is substantially decreased. As the boom is raised, the hoist line travels over the sheave 19 away from the load which is being lifted. Thus, the load is lifted both by the leverage action of the boom as it is raised by the hydraulic operator and by the pulley action as the hoist line travels over the sheave in a direction away from the load being lifted.

A further advantage of the decreasing hoist line distance between the sheave and the lifting hook is that it creates greater clearance for the load as it is swung over the platform or the bed of the truck. The present invention also provides increased stability because the weight of the object being lifted is supported by both the boom and the hoist line, not the boom alone.

Referring to FIG. 8, another embodiment of the portable hoist according to the present invention is illustrated schematically. In this embodiment, the hoist line 18a comprises a chain portion 27a which is anchored at a point 36a on the underside of the extended boom 23a adjacent to the free end of the boom 16a. Attached to the chain portion 27a is the cable portion 29a of the hoist line 18a which extends to the lower end of the support structure 13a where it is connected to the support structure by means of a sheave 37a. The cable portion 29a of the hoist line 18a loops over the sheave 37a and then extends back toward the free end of the boom 16a and loops over the sheave 19a. At this end of the cable, a means 20a for attaching the hoist line to a load is provided, such as a hook.

The embodiment illustrated in FIG. 8 provides additional mechanical advantage and stability for the portable hoist of the present invention. The boom 15a, and the two reaches of the hoist line 18a support the weight of the load. Further, the lifting of the load is now achieved by leverage, due to the raising of the boom by the hydraulic operator, and by the action of two pulleys, the sheave at 37a and the sheave at 19a.

FIGS. 9 and 10 illustrate additional embodiments of the mounting which can be used for the portable hoist of the present invention. Referring to FIG. 9, there is illustrated a mounting 38 substantially identical to the mounting 11 of the hoist in FIG. 1, except that a foot 40 extends from the upright support member 39 of the mounting 38 perpendicular thereto.

A gusset 41 is connected to the side of the face of the upright support member 39 and the foot 40 of the mounting for support. Vertical hinge pin receivers 42, identical to those in the hoist of FIG. 1, are a preferred means for connecting the upright support structure of the hoist to the mounting for swinging movement about a vertical axis. The hinge pin receivers are attached spaced apart onto the upright support member 39 of the mounting 38.

The embodiment in FIG. 9 is a preferred mounting for the portable hoist when, additional support is needed for the hoist. For example, the sidewall of a pick-up or a workbench may not be strong enough alone to support the weight of the operating hoist. In that case, the added foot 40 provides additional support because it can be attached to the bed of the truck or to the workbench surface.

The embodiment of the mounting shown in FIG. 10 is preferred when the hoist is mounted on a workbench or pick-up, or other vehicle, without any sidewall. In that case, the post 43 together with the base 44 are attached to the bed of the truck or the workbench surface.

The vertical hinge pin receivers 45 attached to the post 43 are identical to those preferred in the hoist of FIG. 1. Holes 46 are provided at the upper end of the post for attachment to whatever upright supporting means may be available, however they need not necessarily be put to use.

What is claimed is:

1. A portable hoist comprising:
   (a) an elongated rigid mounting member having first and second planar surfaces disposed at right angles to each other;
   (b) an upright support structure;
   (c) a boom pivotally secured at one end to the upper end of said support structure whereby the free end of said boom can be raised to lift a load or lowered to engage or lower a load;
   (d) hinged connection means comprising hinge pins and hinge pin receivers interconnecting said mounting member and said support structure at the junction of said first and second planar surfaces of said mounting member, such that said boom swings 180° from an inoperative inwardly extending out-of-the-way position, wherein said support structure abuts said first planar surface, said first planar surface being perpendicular to the longitudinal axis of said boom when said boom is in said out-of-the-way position, to an outwardly extending operative position in a plane parallel to and transposed laterally from said plane occupied by said boom in said out-of-the-way position, wherein said support structure abuts said second planar surface, said second planar surface being parallel to said longitudinal axis of said boom when said boom is in said outwardly extending position, said support structure being separable from said mounting member by lifting said support structure along the longitudinal axis of said hinge pins, thereby enabling said support structure and its attachments to be readily removed from said mounting member and transported to another site;
   (e) means acting between said support structure and said boom to effect raising and lowering of said boom; and
   (f) hoist line means connected to said free end of said boom having means for attachment to said load.

2. A portable hoist for vehicle installation where the vehicle has a load-carrying body having at least one wall, comprising:
   (a) an elongated rigid mounting member for attachment to said wall, said mounting member having first and second planar surfaces disposed at right angles to each other;
   (b) an upright support structure;
   (c) a boom pivotally secured at one end to the upper end of said support structure whereby the free end of said boom can be raised to lift a load or lowered to engage or lower a load;
   (d) hinged connection means comprising hinge pins and hinge pin receivers interconnecting said mounting member and said support structure at the junction of said first and second planar surfaces of said mounting member, such that said boom swings 180° from an inoperative inwardly extending out-of-the-way position adjacent to said wall, wherein said support structure abuts said first planar surface, said first planar surface being perpendicular to the longitudinal axis of said boom when said boom is in said out-of-the-way position, to an outwardly extending operative position in a plane parallel to and transposed laterally from said plane occupied by said boom in said out-of-the-way position, wherein said support structure abuts said second planar surface, said second planar surface being parallel to said longitudinal axis of said boom when said boom is in said outwardly extending position, said support structure being separable from said mounting member by lifting said support structure along the longitudinal axis of said hinge pins, thereby enabling said support structure and its attachments to be readily removed from said mounting member and transported to another site;
   (e) means acting between said support structure and said boom to effect raising and lowering of said boom; and
   (f) hoist line means connected to said free end of said boom having means for attachment to said load.

3. A portable hoist for vehicle installation where the vehicle has a load-carrying body having at least one side wall, comprising:
   (a) an elongated rigid mounting member for attachment to said side wall, said mounting member having first and second planar surfaces disposed at right angles to each other;
   (b) an upright support structure;
   (c) a boom pivotally secured at one end to the upper end of said support structure whereby the free end of said boom can be raised to lift a load or lowered to engage or lower a load;

(d) hinged connection means comprising hinge pins and hinge pin receivers interconnecting said mounting member and said support structure at the junction of said first and second planar surfaces of said mounting member, such that said boom swings 180° from an inoperative inwardly extending out-of-the-way position inside the recess of and adjacent to said side wall, wherein said support structure abuts said first planar surface, said first planar surface being perpendicular to the longitudinal axis of said boom when said boom is in said out-of-the-way position, to an outwardly extending operative position in a plane parallel to and transposed laterally from said plane occupied by said boom in said out-of-the-way position, wherein said support structure abuts said second planar surface, said second planar surface being parallel to said longitudinal axis of said boom when said boom is in said outwardly extending position, said support structure being separable from said mounting member by lifting said support structure along the longitudinal axis of said hinge pins, thereby enabling said support structure and its attachments to be readily removed from said mounting member and transported to another site;

(e) means acting between said support structure and said boom to effect raising and lowering of said boom; and (f) hoist line means connected to said free end of said boom having means for attachment to said load.

* * * * *